United States Patent [19]

Mykytiuk et al.

[11] Patent Number: 5,292,168
[45] Date of Patent: Mar. 8, 1994

[54] SIDE WINDOW SUNSHADE FOR A MOTOR VEHICLE

[75] Inventors: William Mykytiuk, Taylor; Abdi Lawassani, Pontiac, both of Mich.

[73] Assignee: United Technologies Automotive, Inc., Dearborn, Mich.

[21] Appl. No.: 990,221

[22] Filed: Dec. 14, 1992

Related U.S. Application Data

[62] Division of Ser. No. 752,408, Aug. 30, 1991, Pat. No. 5,192,110.

[51] Int. Cl.⁵ .................................. B60J 3/00
[52] U.S. Cl. ......................... 296/97.8; 296/97.4
[58] Field of Search ................ 296/97.8, 97.4; 160/238, 370.2, 265, DIG. 2

[56] References Cited

U.S. PATENT DOCUMENTS

| | | | |
|---|---|---|---|
| 3,584,910 | 6/1971 | Lupul | 160/23 |
| 4,468,062 | 8/1984 | Marcus et al. | 296/97.8 |
| 4,570,991 | 2/1986 | Lystad | 296/97.1 |
| 4,614,375 | 9/1986 | Miller et al. | 296/97.1 |
| 4,824,160 | 4/1989 | Fleming | 296/97.4 |
| 4,921,299 | 5/1990 | Herrick | 296/97.8 |
| 5,000,506 | 3/1991 | Abu-Shumays et al. | 296/97.8 |

Primary Examiner—Robert R. Song
Attorney, Agent, or Firm—William W. Habelt

[57] ABSTRACT

A vanity mirror (27) is carried by a primary sunshade (24) stored above the headliner (5) of a motor vehicle. Lighting (117) for use with the mirror is disposed in the headliner remote from the primary sunshade and mirror. Secondary sunshades (13) are stored in either the headliner or roof pillars for operation completely independently of the primary sunshade.

4 Claims, 4 Drawing Sheets

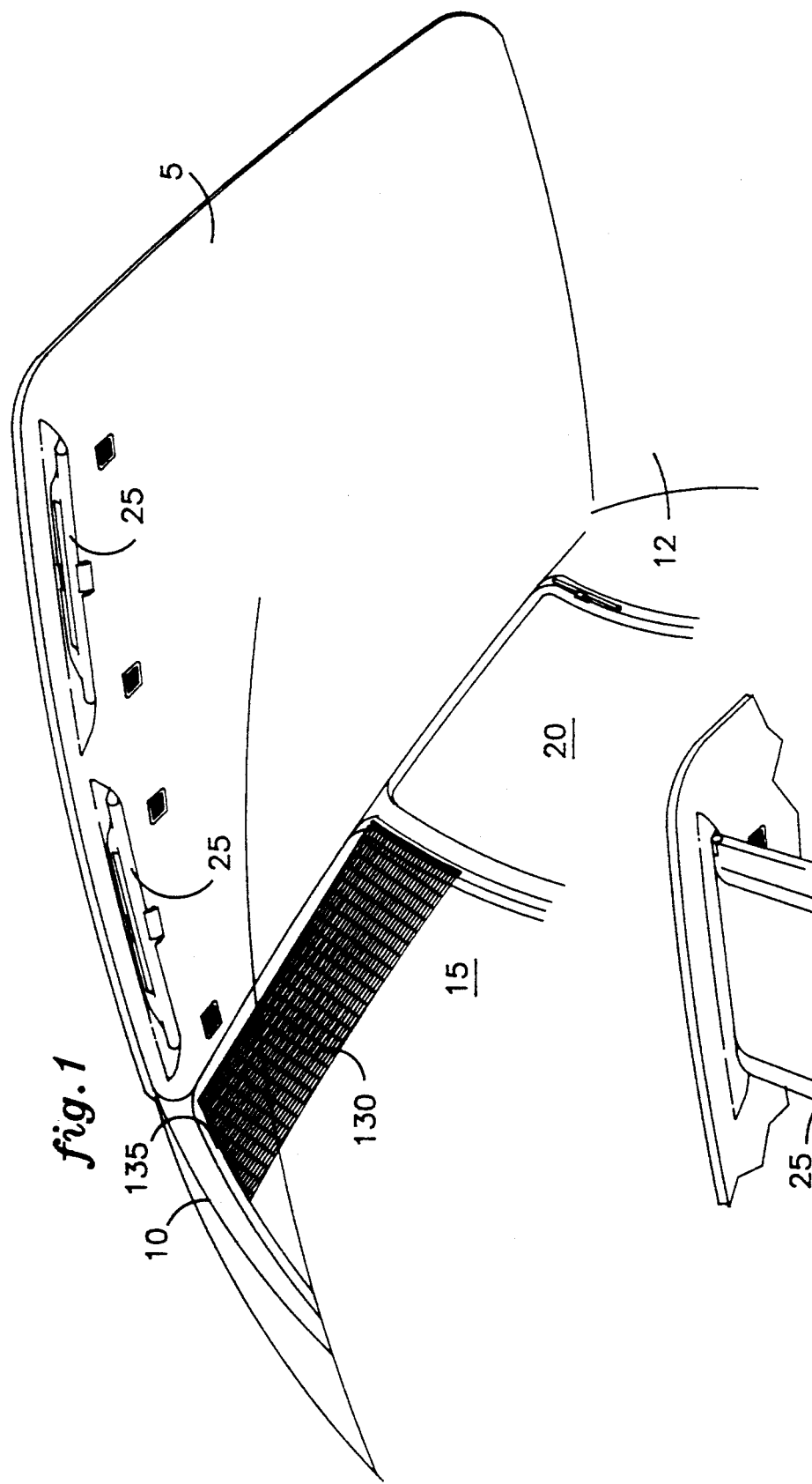

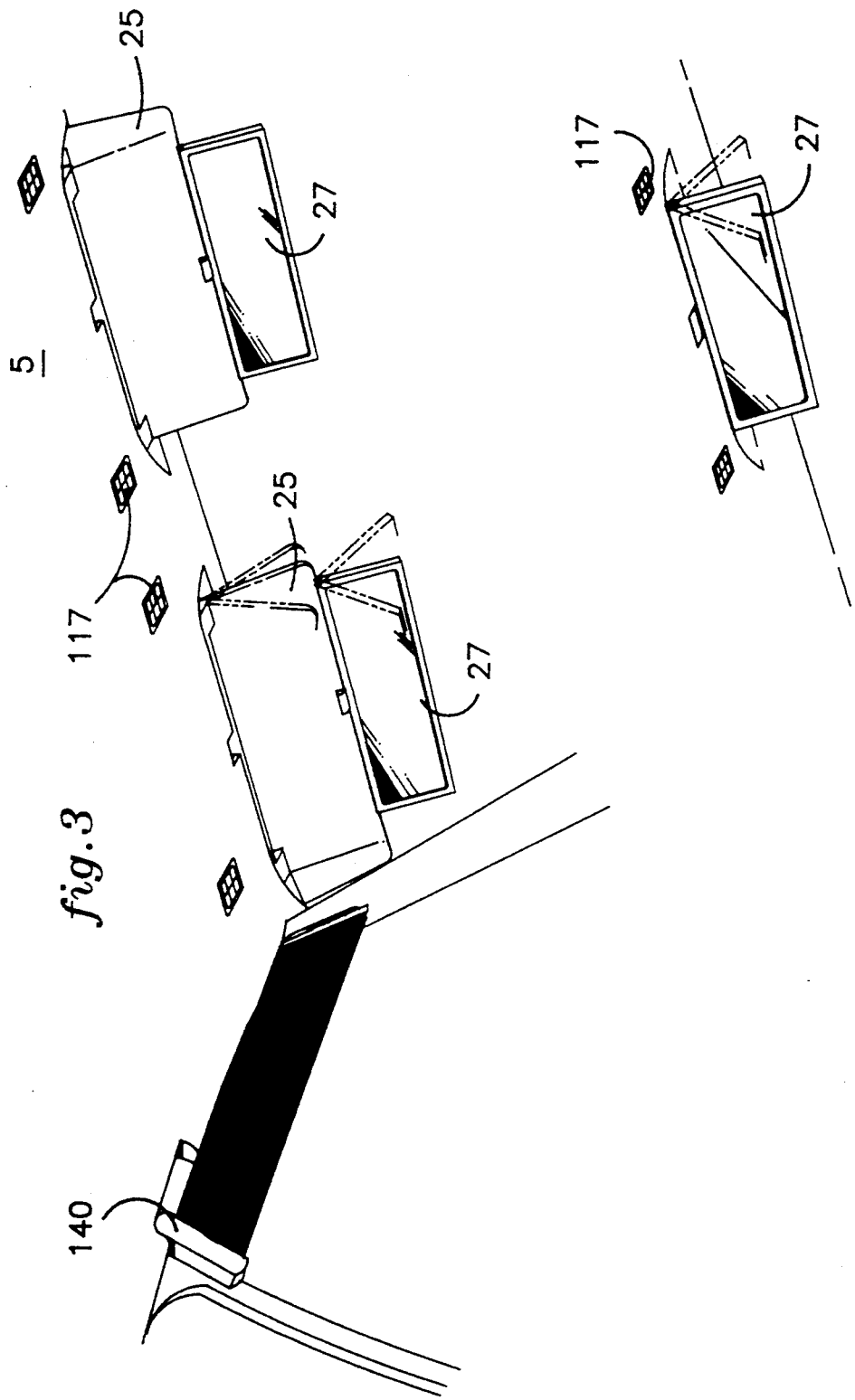

SIDE WINDOW SUNSHADE FOR A MOTOR VEHICLE

This is a division of U.S. application Ser. No. 07/752,408 filed on Aug. 30, 1991, U.S. Pat. No. 5,192,110.

TECHNICAL FIELD

This invention relates generally to the interiors of motor vehicles such as automobiles and trucks, and particularly to sunshades and vanity mirrors for such motor vehicles.

BACKGROUND ART

Current sunshade systems for motor vehicles are of two general types. The first employs a single (primary) visor panel pivotally mounted adjacent the upper edge of the vehicle windshield (the forward edge of the vehicle roof). The visor is stored in a position against the vehicle's headliner and is pivotable downwardly to shield the eye's of an occupant of the vehicle from sunlight entering the vehicle of the windshield thereof. The visor panel may also be pivoted horizontally to a position adjacent a front, side window of the vehicle to shield the occupant from sunlight entering the vehicle through a side window.

A second type of sunshade system is similar to that described hereinabove but employs a second visor as well. The second visor is also pivotally mounted adjacent the forward edge of the vehicle roof and pivots only up and down. This second visor, sometimes known as a secondary visor, shades the vehicle occupant from sun entering through the windshield when the first visor panel (also known as the primary visor) is positioned against the side window of the vehicle. The secondary visor is typically thinner than the primary visor and is stored against the headliner, between the primary visor and the headliner when the visors are not in use. An example of such a system is disclosed in U.S. Pat. No. 4,783,111 to Hemmeke, et al.

It is a common practice, particularly in upscale vehicles to provide the primary visor on the upper (when stored) surface thereof with a vanity mirror module consisting of a mirror in which the occupant of the vehicle can view himself or herself, and a pair of lights usually disposed at the sides of the mirror for illuminating the occupant's face. The module may also include an on/off switch and a dimmer for the lights as well as a cover for the mirror and a suitable latch therefor. An example of such a system is disclosed in U.S. Pat. No. 4,000,404 to Marcus.

The sunshade-vanity mirror systems described hereinabove exhibit a number of limitations and disadvantages. In the evolution of automobile body design, the windows of the vehicle have become larger and the roof area thereof has become smaller whereby the location of the forward edge of the roof which, in the part, was well forward of the heads of the vehicle occupants, is now almost directly thereabove. Such close proximity between the forward edge of the roof and the occupant's heads renders operation of prior art sunvisor systems awkward at best. For example, in modern vehicles, it is often required that an occupant move his head backward in order to provide room to pivot the relatively large primary visor downwardly from a stored position against the headliner to an operating position between the occupant's eyes and the windshield. The same is true for the pivoting of the primary visor from a position adjacent the windshield to its other operating position adjacent the side windows of the vehicle. Likewise, since the vanity mirror is mounted on the upper surface of the primary visor, similar difficulties are encountered in pivoting the primary visor downwardly, from its stored position, to a position where the vanity mirror may be used. Furthermore, since deployment of the vanity mirror requires that the large primary visor be pivoted downwardly, a large field of view through the windshield is blocked by the primary visor merely for deploying the much smaller vanity mirror. Similarly, to shade the occupant's eyes from sun entering the vehicle at the upper-most portion of the windshield, the large primary visor must be swung through an arc within which the primary visor, at least momentarily, blocks a major portion of the occupant's forward field of view. This commonly known "blind spot" represents a safety risk when the primary visor is deployed by the driver as the vehicle is operated. Such inconvenient adjustment of the primary visor is also required to access the secondary visor stored therebeneath. There are various other drawbacks associated with known visor vanity mirror systems. Since the lighting for the vanity mirror is typically disposed adjacent to the mirror directly in front of the vehicle occupant, such lighting tends to be very harsh and glaring to the user thereof, particularly at night. Such placement of the lighting also tends to cause severe shadowing and therefor significantly limits the utility of the mirror in such applications as the application of cosmetics and the like. Furthermore, in order to adjust the distance between the mirror and the occupant's face, the occupant must continually adjust his or her seating position since the mirror is not adjustable in a front-to-back direction. Inasmuch as the module comprising the vanity mirror lights and controls therefor is rather heavy, a bulky primary visor and mount therefor is required to adequately support such a module. Such bulk not only reduces vehicle headroom, but presents a risk of injury due to impact with such equipment in the event of a vehicle crash.

As mentioned previously, in current sunshade systems for motor vehicles, the primary sun visor panel is a rigid member pivotally mounted adjacent the upper edge of the vehicle windshield so as to pivot downwardly from a stowed position along the headliner of the vehicle to a position against the windshield to shield the eye's of an occupant from sunlight entering through the windshield of the vehicle or to pivot horizontally to a position adjacent a front, side window of the vehicle to shield an occupant's eyes from sunlight entering through the front, side window. It has also been suggested to pivotally mount a rigid sun visor panel to the upper region of the forward roof pillar so as to pivot upwardly from a stowed position along the forward roof pillar to a deployed position so as to extend along the front side window. Systems of this type are disclosed, for example, in U.S. Pat. Nos. 4,570,991 and 4,614,375. It is also known to dispose a visor panel within the headliner above a side window such that when the side visor panel is in a raised position, its is stowed within the headliner and when the side visor panel is in a lowered position it extends downwardly from the headliner over the side window. Systems of this type are disclosed, for example, in U.S. Pat. Nos. 4,468,062; 4,824,160 and 5,000,506.

DISCLOSURE OF INVENTION

In accordance with the present invention, a side sunshade system for a motor vehicle interior comprises a concealable, flexible sheet storable in a furled condition within the interior of the motor vehicle and extendable in a unfurled condition across the side from one roof pillar to another roof pillar. In one embodiment, the furled sheet is stored in one of the roof pillars, most advantageously the center roof pillar. In another embodiment, the furled sheet is stored in a housing which is pivotable downwardly from a first position within said headliner to a second position generally parallel to one of the roof pillars, most advantageously the center roof pillar. The sunshades of the system of the present invention operate completely independently of the vanity mirror or the primary visor and may be deployed merely by unfurling the sheet.

BRIEF DESCRIPTION OF DRAWINGS

FIG. 1 is a perspective view of a motor vehicle interior employing the sunshade and vanity mirror system of the present invention;

FIG. 2 is a perspective view of a primary sunvisor (sunshade) employed in the system of the present invention, in an operating position; in the system of the present invention;

FIG. 3 is a perspective view of the vehicle interior taken from the rear thereof and showing both primary and secondary sunshades as well as the vanity mirrors extended to the operating positions thereof;

FIG. 4 is a perspective view similar to FIG. 3, showing the extension of one of the vanity mirrors to its operating position without deployment of the primary visor on which the vanity mirror is mounted;

BEST MODE FOR CARRYING OUT THE INVENTION AND INDUSTRIAL APPLICABILITY THEREOF

Figure 5:
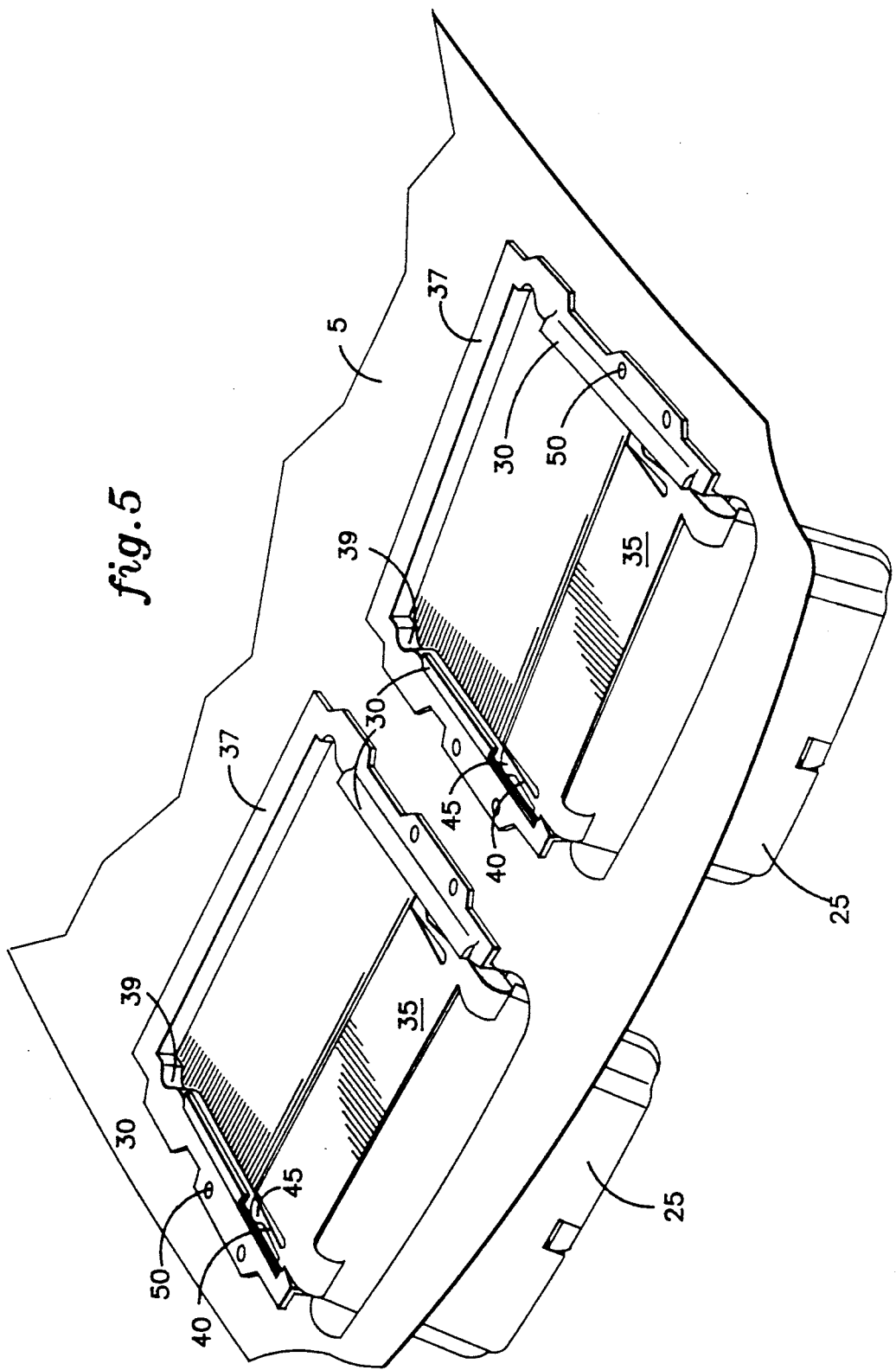
FIG. 5 is a perspective view taken from above the headliner, showing the means for mounting the primary visors to the headliner with the visors in extended, operating positions.
Figure 6:
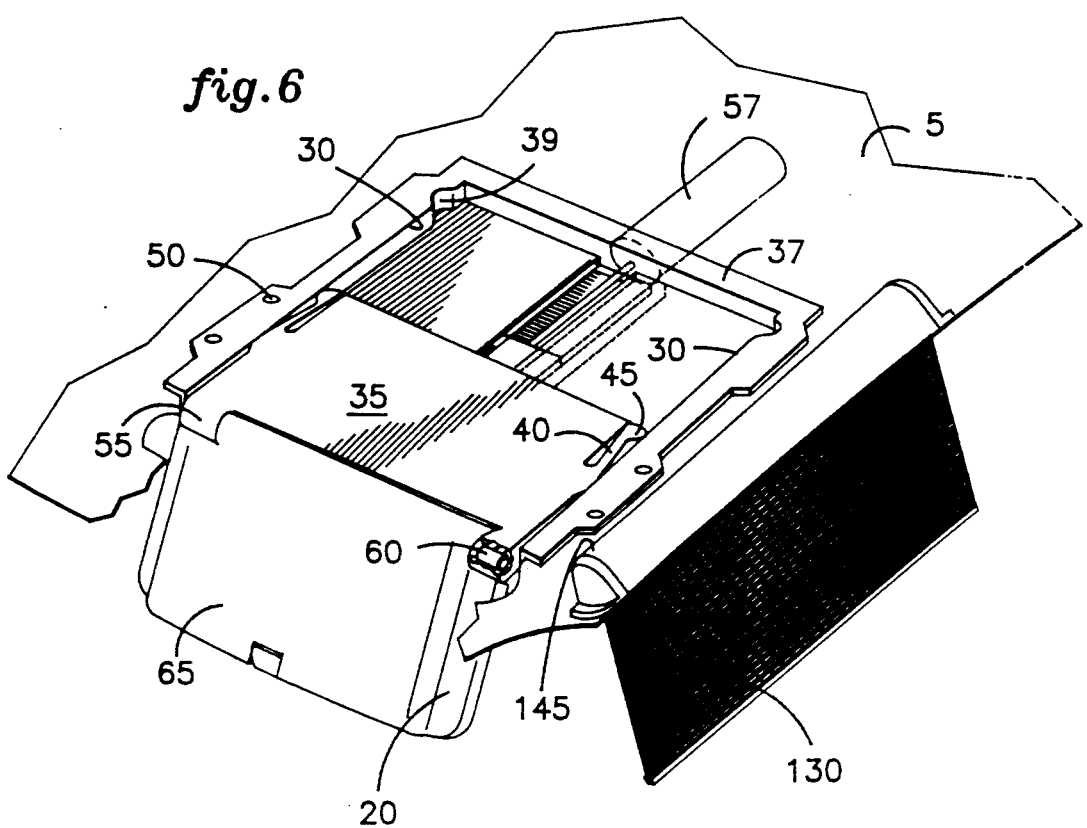
FIG. 6 is a view similar to FIG. 5 but showing a secondary sunshade stored within the headliner and a means for powering the primary visors to the extended, operating positions thereof.

Referring to FIG. 1, the interior of an automobile roof (not shown) is covered by a decorative headliner 5 of any of various known constructions. The headliner covers the entire roof from the windshield 10 to the backlight 12 and from the side windows 15 and 20 on one side of the interior to the opposite side windows (not shown). Primary sunshades or visor panels 25 are stored between the headliner and the roof of the vehicle and are deployed by grasping the forward edges thereof and pulling forward and down in a direction generally parallel to the curvature of the headliner and windshield to the position shown in FIG. 2. Each of the sunshades is provided with a vanity mirror which is deployed by grasping the edge of the mirror 27 and pulling the mirror forward, down to the positions shown in FIGS. 3 and 4. FIGS. 5 and 6 illustrate the mounting arrangement for primary visors 25. The upper surface of headliner 5 supports tracks 30 on which carrier 35 slides. The tracks are connected by spacer (rib) 37 and are notched at 39. Alignment of the tracks is maintained by the inherent stiffness of the headliner as well as rib 37. Carrier 35 includes a pair of opposed outwardly biased resilient legs 40 each provided with a foot 45 which presses against an inner surface of an associated track to maintain the engagement of the carrier with the tracks. Feet 45 are received within notches 39 to latch the carrier in place when the visors are stored above the headliner. The tracks may be mounted to the headliner by any suitable fasteners shown at 50 and will typically be molded from any of various lightweight synthetic plastics.

Carrier 35, like tracks 30 is typically formed from synthetic plastic and is provided at the forward end thereof with integral bushings (pivot mounts) 55 and may be driven along tracks 30 by a suitable linear actuator (motor) 57. These mounts frictionally receive pivot rods 60 secured within hollows in rear edge of primary visor 25 whereby visor 25 is pivotable with respect to carrier 35. The friction fit between rods 60 and pivot mount 55 holds the visor in any of various desired angular positions with respect to the vehicle's headliner and windshield (see FIG. 3).

Figure 7:
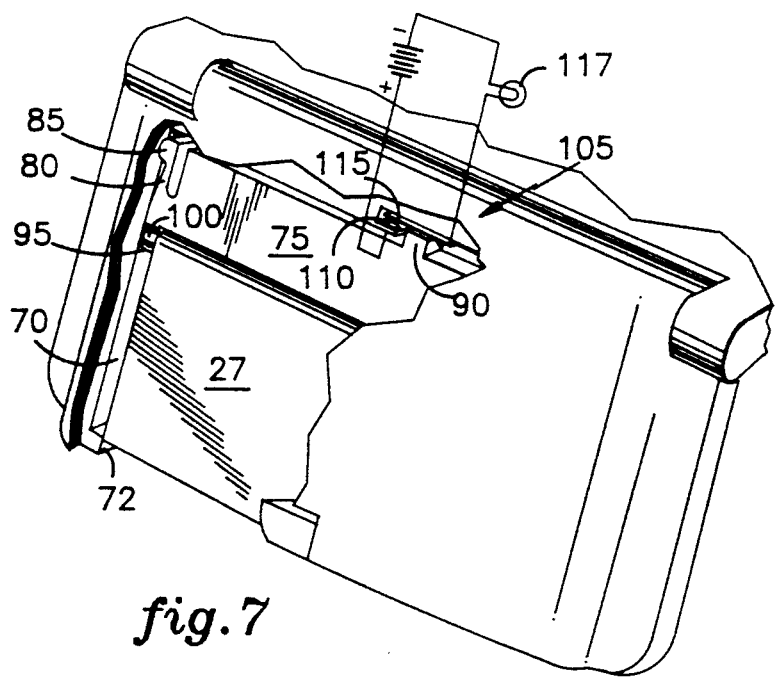
FIG. 7 is a perspective view of one of the primary visors with portions thereof broken away to show mounting of the vanity mirror to the visor and a mechanism for automatically illuminating a lighting means when the vanity mirror is deployed.

Visor panel 25 may be made of any of various known padded or unpadded constructions. The panel is of a thickness less than the thickness of tracks 30 so that in a stored position, the visor may be received between the tracks and between the headliner and vehicle roof. In the illustrated embodiment, the primary visor is molded from a synthetic plastic with an integral compartment 65 in the upper (forward) surface thereof. As best seen in FIG. 7, compartment 65 includes integral tracks 70 with lower detents 72, within which a second carrier 75 is slidably received. Carrier 75 is of a construction similar to carrier 35 in that it includes integral resilient legs 80 which are biased outwardly and are provided at the ends thereof with integral feet 85 which bear up against the inner surfaces of tracks 70. Detents 72 vertically restrain carrier 75 within compartment 65 by engagement with feet 72 when the mirror is deployed. Frictional resistance between track 70 and feet 85 hold the carrier in a desired position within the interior of the visor. The upper (rear) edge of carrier 75 is provided with a projection 90. The carrier also includes integral pivot mounts or bushings 95 which frictionally receive mounting rods 100 fixed to the upper (rear) edge of the mirror as by accommodation interiorly thereof. The frictional engagement between pivot mounts 95 and rods 100 allow the mirror to be placed in any desired angular position with respect to the primary visor as illustrated in FIGS. 3 and 4.

In addition to carrier 75 and mirror 27, visor panel 25 accommodates an electric switch 105, the contacts 110 and 115 of which are normally biased closed. The switch is connected through suitable wires to the vehicle's electrical system and to lamps 117 disposed in the headliner remotely from the primary visor and mirror. It will be seen from FIG. 7 that pulling downwardly on mirror 27 will cause contact 115 to close against contacts 110 completing the circuit from the vehicle battery to the lights to energize the lights.

Referring to FIGS. 1, 3 and 6, secondary sunshades 130 comprise elongate flexible sheets of any suitable opaque or partially opaque material such as any of various woven flexible materials, plastic sheet material or other material which may be furled and stored in such a furled condition. In FIG. 1, the material comprises a screen stored within a central (after referred to as a "B") roof pillar and extendable forwardly to the windshield pillar of the vehicle being latched thereto at 135. Of course, a suitable retraction mechanism such as a spring loaded retractor employed in various domestic window shade applications may be employed to furl screen 130 for storing within the central roof pillar when latch 135 is disengaged. Alternatively, the sunshade may be formed in a helical shape, the inherent resilience of the material providing a sufficient force for furling the shade when not in use. Referring to FIG. 3, secondary sunshade 130 and its retraction mechanism may be housed within a pivotable housing 140 which is accommodated within the vehicle headliner when the secondary sunshade is not being used, and pivots downwardly to a position generally parallel to the central roof pillar when it is desired to extend the secondary sunshade. Referring to FIG. 6, secondary sunshade 130 may be stored within a housing 145 which is permanently fixed to the upper surface of the headliner. Like housing 140, housing 145 accommodates both the furled secondary sunshade and its retractor mechanism. When it is desired to employ secondary sunshade 130, the sunshade is pulled downwardly and either held in that position by the retractor or latched to the vehicle door (not shown) at the bottom of the window opening thereof. As best seen in FIG. 1, further secondary sunshades may be employed in the rear roof pillar, unfurling forwardly to block sunlight from entering the vehicle through the rear side windows.

Operation of the sunshade (vanity mirror system) is as follows. From the positions of the primary sunshades shown in FIG. 1, in the event that a user requires shading from sun entering the vehicle from the windshield, the edges of primary visor panels 25 are pulled forward (or motor 57 actuated) moving the visors forwardly to positions adjacent the vehicle's windshield, from which positions the visors may be pivoted to any angular orientation with respect to the vehicle headliner and windshield as will be determined by the position of the sun with respect to the vehicle. The frictional pivot mount 65 securely holds the visor in any such desired position. In the event that an occupant of the vehicle wishes to use the vanity mirror, the forward edge of the vanity mirror is pulled down from the edge of the primary visor panel to the position shown in FIG. 3. It is significant to note that in the event that it is desired to use the vanity mirror when the primary visor panels are not deployed, the vanity mirror may be pulled from its stored position within the primary visor panel forwardly (generally parallel to the vehicle windshield) and then pivoted to any desired angular orientation, frictional pivot mounts 95 holding the vanity mirror in such a position and switch 105 automatically energizing lamps 117. As set forth hereinabove, in the event that shading is required from the side as well as the front of the vehicle, secondary sunshades 130 may be deployed by unfurling independently of the primary visor panels or the vanity mirrors.

From the foregoing, it will be apparent to those skilled in the art that the sunshade and vanity mirror system of the present invention overcomes many of the drawbacks exhibited by prior art systems. Since the secondary sunshades are completely independent from the primary visor panel in both storage and operation, the secondary sunshades and primary visor panels are much more convenient to use than their prior art counterparts which often require manipulation of the primary visor in order to adjust the secondary visor. Moreover, since the primary visor panel and secondary visor may be deployed without any awkward horizontal pivoting, vehicle occupants are not required to move their heads or adjust their seating positions to accommodate any horizontal pivoting of the primary and secondary sunshades in the deployment thereof. The same is true for the vanity mirror, which may be extended rom the primary visor panel without regard to the position of the panel. Since the vanity mirror may be deployed while the primary visor remains stored, there is no unnecessary blocking of the occupant's field of view through the windshield by a visor panel merely for use of the much smaller vanity mirror. Similarly, blind spots associated with pivoting a large primary visor through a long vertical arc in adjusting the position thereof is eliminated with the present invention since the primary panel pulls out of the headliner in a direction generally parallel to the windshield.

The remoteness of the lighting employed with the system of the present invention eliminates the harsh glare and shadows associated with prior art vanity lighting disposed adjacent the vanity mirror on a primary visor panel and shining directly on a user thereof. The mirror and lighting are much more convenient to use due to the convenient adjustability of both the primary visor and the vanity mirror which allows the mirror to be placed at any suitable distance from a viewer's face, unlike prior art vanity mirrors, the spacing of which from the viewer's face depends entirely on the geometry of the visor on which the mirror is mounted. The system of the present invention is lightweight and, therefore, compact and thus infringes minimally on interior head room and presents a reduced risk of injury in the event of impact with an occupant's head in a crash situation.

While the particular embodiment of the present invention has been illustrated and described, it will be apparent that many changes may suggest themselves to those skilled in the art without departure from the invention herein. For example, while simple rod and socket frictional pivot mounts are employed in the mounts for the mirror and visor, various other known pivot mounts which maintain the angular orientation of the mirror and visor may also be used. Likewise, the shape and appearance of the visor panels, mirrors and secondary sunshades may also be modified without departure from the invention herein, as may the materials described hereinabove. It is intended by the following claims to cover these and all other changes and modifications as fall within the true spirit and scope of this invention.

Having thus described the invention, what is claimed is:

1. A side, sunshade system for a motor vehicle interior including a headliner and a plurality of roof pillars, said side sunshade system comprising a concealable, flexible sheet storable in a furled condition within said motor vehicle interior in one of said roof pillars and extendable in a unfurled condition to another of said roof pillars.

2. The side sunshade system of claim 1 characterized by said one roof pillar comprising a central pillar and said other pillar comprising one of a forward and rearward pillar.

3. A side, sunshade system for a motor vehicle interior including a headliner and a plurality of roof pillars, said side sunshade system comprising a concealable, flexible sheet storable in a furled condition and a housing means for storing therewithin said flexible sheet in said furled condition, said housing means being pivotable downwardly from a first position within said headliner to a second position within said motor vehicle interior generally parallel to one of said roof pillars, said flexible sheet extendable in a unfurled condition from said second position to another of said roof pillars.

4. The side sunshade system of claim 3 characterized by said one roof pillar comprising a central roof pillar.

* * * * *